Nov. 29, 1938. A. BERNAT 2,138,537
MILK PAIL
Filed March 19, 1938
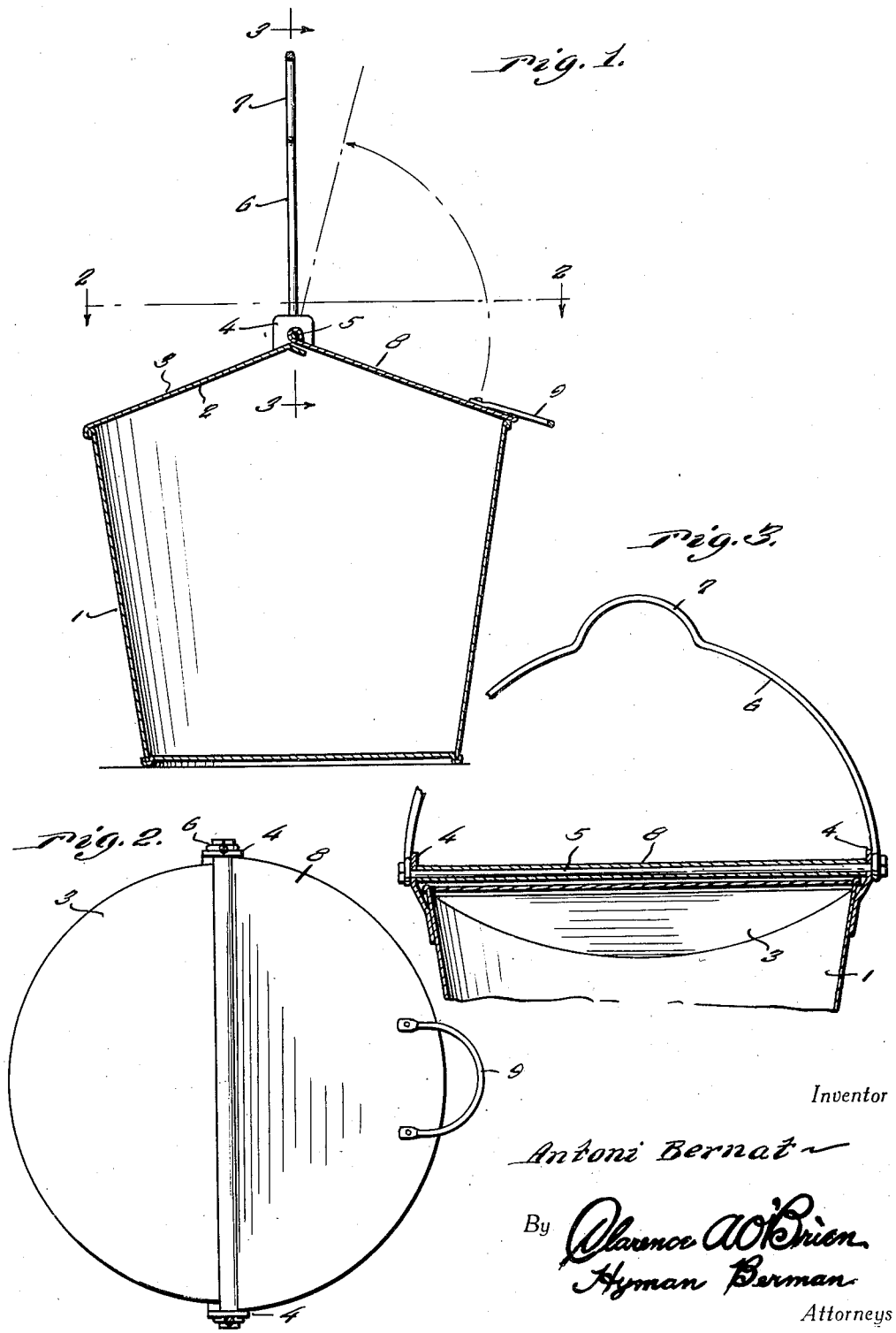
Inventor
*Antoni Bernat*
By *Clarence A. O'Brien*
*Hyman Berman*
Attorneys Patented Nov. 29, 1938

2,138,537

UNITED STATES PATENT OFFICE 2,138,537

MILK PAIL

Antoni Bernat, Tewksbury, Mass.

Application March 19, 1938, Serial No. 197,018

2 Claims. (Cl. 31—50)

The present invention relates to new and useful improvements in milk pails and has for its primary object to provide, in a manner as hereinafter set forth, a device of this character comprising a cover embodying a novel construction and arrangement whereby dirt and other foreign matter will be excluded.

Other objects of the invention are to provide a milk pail of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical section through a milk pail constructed in accordance with the present invention.

Figure 2 is a view in horizontal section, taken substantially on the line 2—2 of Fig. 1.

Figure 3 is a view in vertical section through the upper portion of the invention, taken substantially on the line 3—3 of Fig. 1.

Referring now to the drawing in detail, it will be seen that the embodiment of the invention which has been illustrated comprises a body 1 of suitable material, preferably metal, of substantially the shape shown to advantage in Fig. 1 of the drawing. It will be noted that the top of the body 1 is substantially anticlinal, as at 2. Fixed in any suitable manner on substantially one-half of the top of the body 1 is a metallic plate constituting a stationary cover section 3.

Rising from the apex portions of the walls of the substantially anticlinal top portion of the body 1 is a pair of apertured ears 4. Mounted in the ears 4 and extending therethrough is a metallic rod 5. The reference numeral 6 designates a bail having its end portions journalled on the end portions of the rod 5 on the outer sides of the ears 4. This is shown to advantage in Fig. 3 of the drawing. The bail 6 includes a handle portion 7.

The reference numeral 8 designates a swinging cover section which is journalled on the rod 5 and which is adapted to cover approximately the other half of the pail. Mounted on the swinging cover section 8 and projecting therefrom is a handle 9 of a shape substantially similar to the handle 7.

It is thought that the manner of using the pail will be readily apparent from a consideration of the foregoing. When milking is being done, the swinging cover section 8, together with the bail 6, is adapted to be swung rearwardly to an open position over the stationary cover section 3. When the pail is not in use or is being carried from place to place, the swinging cover section 8 is, of course, swung to closed position. When it is desired to pour the milk the cover section 8 will swing open by gravity and from the pressure of the outwardly flowing milk. The handle 9 is so formed and arranged that, when the cover section 8 is swung upwardly to a vertical position said handle 9 will be immediatly adjacent the handle 7 of the bail 6, thus permitting the pail to be carried and said cover section 8 to be held open with one hand.

It is believed that the many advantages of a milk pail constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A milk pail comprising a body open at its top, ears rising from the upper portion of the body on diametrically opposite sides thereof, a rod mounted in the ears and extending therethrough, a bail journalled on the end portions of said rod and including an arcuate handle portion, a swinging cover section hingedly mounted on the rod, and a substantially U-shaped handle mounted on the free end portion of said cover section and projecting therefrom and adapted to be positioned adjacent the handle portion of the bail when said cover section is in open position.

2. A milk pail comprising a body having a substantially anticlinal top, a stationary cover section mounted on one side of the substantially anticlinal top of the body, apertured ears mounted on the apex portion of the substantially anticlinal top and rising therefrom, a rod mounted in said ears and extending therethrough, a bail having its end portions journalled on the end portions of the rod adjacent the outer sides of the ears, said bail including an arcuate handle portion, a swinging cover section journalled on the rod between the ears and, when in closed position, being adapted to cover the other half of the substantially anticlinal top of the body, and an arcuate handle fixed on the free end portion of said swinging cover section and projecting therefrom, said handle being adjacent the handle portion of the bail when the swinging cover section is in raised position.

ANTONI BERNAT.